Dec. 23, 1958        P. L. FERGOT        2,865,316

WORK SUPPORTING AND GUIDING DEVICE

Filed Nov. 15, 1957        2 Sheets-Sheet 1

INVENTOR
PAUL L. FERGOT

ATTORNEY

Dec. 23, 1958 P. L. FERGOT 2,865,316
WORK SUPPORTING AND GUIDING DEVICE
Filed Nov. 15, 1957 2 Sheets-Sheet 2
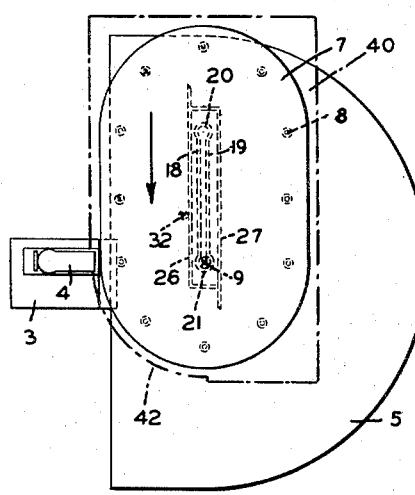
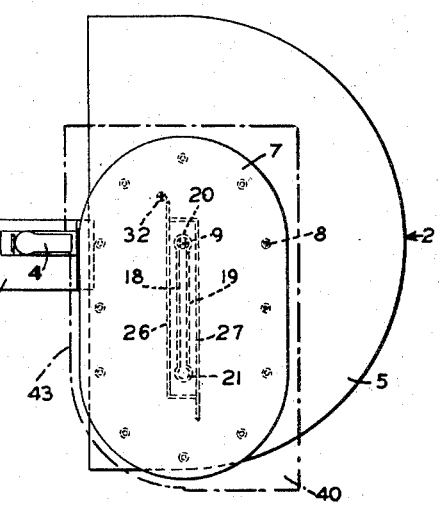
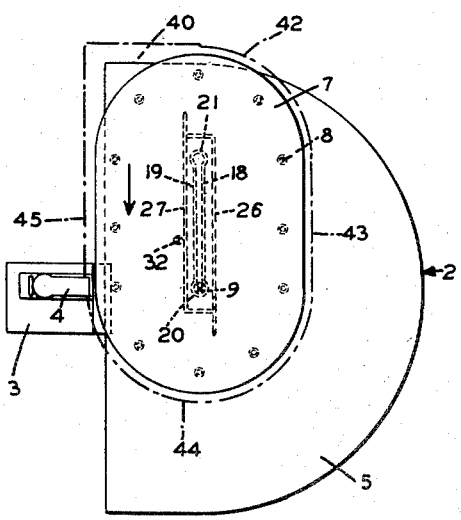
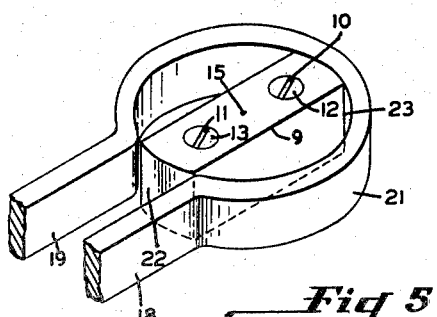
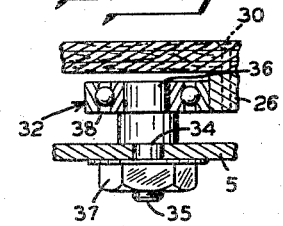
INVENTOR
PAUL L. FERGOT
ATTORNEY

United States Patent Office 2,865,316
Patented Dec. 23, 1958

2,865,316

WORK SUPPORTING AND GUIDING DEVICE

Paul L. Fergot, Oshkosh, Wis., assignor to Deltox Rug Company, Oshkosh, Wis., a corporation of Wisconsin Application November 15, 1957, Serial No. 696,740

6 Claims. (Cl. 112—2)

This invention relates to a work supporting and guiding device. It is concerned more particularly with a device for guiding a web of material, such as a web woven fibrous rug material, so as to describe a closed oval path. The guiding device is ideally suited for use with a combined cutting and lock-stitch sewing machine in the fabrication of oval rugs from pieces of woven rug fabric, such as woven fiber carpeting material.

In the fabrication of oval rugs which have arcuate ends and straight sides, rug fabric is cut into oval shape from rectangular pieces and the severed edges are lock-stitched to prevent unravelling. It is desirable to do the lock-stitching at the same time the rug fabric is being cut into oval shape to be sure that no unravelling occurs between the time of cutting and the time of lock-stitching. This is particularly true with rug materials such as the relatively stiff rug fabrics made from twisted paper yarns or combinations of such twisted paper and wool or synthetic fiber yarns. While it is possible to clamp the carpeting material to a template or to provide a desired outline mark on the surface of the rug fabric material and then manually guide the material through a combined cutting and lock-stitching machine, this cannot be accomplished conveniently, accurately, and economically, particularly with large sized oval rugs, such as the 9' x 12', 8' x 10', and 6' x 9' sizes. The problem is rendered more difficult with relatively stiff fabrics such as the woven paper materials referred to previously.

The principal object of the present invention is to provide a guiding device upon which a blank of material to be severed, such as a piece of woven floor covering fabric, may be positioned and which may be caused to traverse a closed oval path.

Another object of the invention is to provide a guiding device which when associated with a severing and/or sewing machine with a power feed for advancing the web of material to be operated upon automatically will cause the web to traverse a closed oval path with a minimum of intervention on the part of the machine operator.

A further object of the invention is to provide a guiding device of the type described above which may be converted readily to describe oval paths of different sizes, as in the fabrication of oval rugs of different sizes.

Other objects of the invention will be clear from the following detailed description of an embodiment of the invention.

According to the present invention, there is provided a supporting table upon which a turntable is mounted for substantially antifrictional movement in a horizontal plane. A center bearing is provided on the table in a fixed location with respect to the center line of the cutting or stitching head with which the guiding device is to be used. A trackway having arcuate ends and parallel sides is provided on the under surface of the turntable which trackway receives the center bearing. The center bearing serves with the trackway to guide the turntable to describe an arcuate path when the center bearing is in engagement with either of the ends of the trackway and to guide the turntable in longitudinal movement in directions parallel to the sides of the trackway when the center bearing is in engagement with the sides of the trackway, intermediate the ends. A guiding stop is provided on the table, and stop and guide rails are provided on the turntable for cooperation with the guiding stop to limit the arcuate movement of the turntable to 180° and to cooperate with the center bearing and trackway in guiding the turntable in its longitudinal movements.

In order that the invention may be more readily understood, an embodiment thereof will be described in conjunction with the attached drawings, in which:

Figure 4 is a perspective view of a portion of a center bearing and guide track arrangement;

Figure 5 is a sectional view to an enlarged scale taken vertically through the device of Figure 1, showing a ball-bearing stop and guide member and a portion of a co-operating stop and guide rail;

Figure 6 is a plan view of a guide track and stop and guide rail assembly; and

Figure 1:
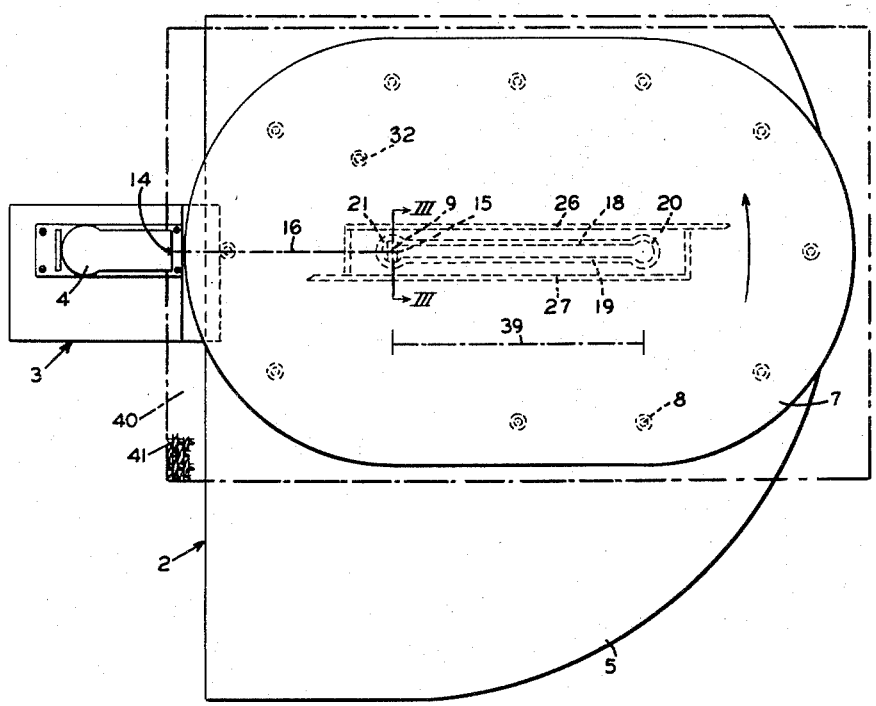
Figure 1 is a top plan view, partly broken away, showing the device positioned for use with a combined cutting and sewing machine for fabrication of an oval shaped fiber rug.

Figures 7, 8, and 9 are diagrammatic views to a smaller scale than Figure 1, indicating a sequence of operations performed in the fabrication of an oval fiber rug.

Figure 2:
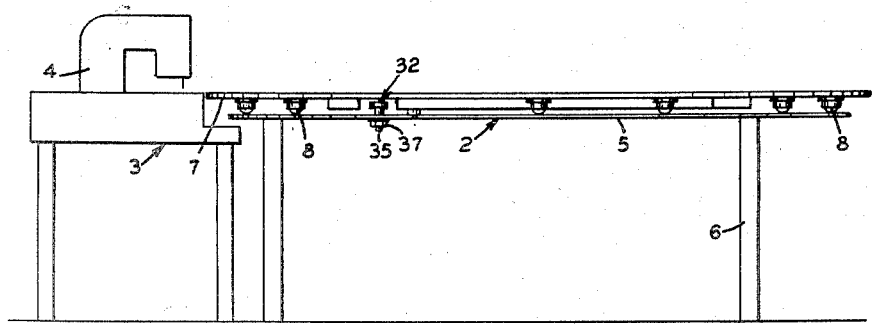
Figure 2 is a side elevational view of the device of Figure 1.

Referring first to Figures 1 and 2, the unit which is arranged for simultaneously cutting an oval rug from a rectangular blank and lock-stitching the severed edge includes a guide table 2 which may be position adjacent to a machine table 3 which carries a cutting and sewing machine 4. The machine 4 may be a reciprocating knife blade cutting machine and a lock-stitcher, such as a Pfaff #151 sewing and cutting machine. The guide table 2 includes a top 5, preferably of sheet metal, mounted upon suitable supporting legs 6.

Mounted for guided movement in a substantially horizontal plane above the table top 5 is a turntable 7 which may be fabricated from plywood, aluminum, or other material. The turntable is supported for substantially frictionless guided movement over table top 5 by a plurality of conveyor balls 8 which are mounted in holders secured to the underside of turnable 7, as shown in Figure 2. These may be Acme-Olson conveyor balls, for example.

Figure 3:
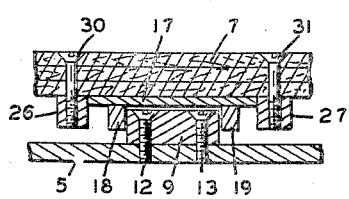
Figure 3 is a sectional view to an enlarged scale, taken along the line III—III of Figure 1.

The turntable 7 is guided in its movement by an arrangement shown in some detail in Figures 3, 4, 5, and 6 and also indicated by dotted lines in Figure 1. The arrangement as shown in Figures 3 and 4 includes a center bearing 9 which is generally rectangular in plan, with arcuate ends and is provided with drilled and counter-sunk openings 10 and 11 (Figure 4) through which pass flat-headed machine screws 12 and 13 (Figure 3) which are received in threaded openings provided in the table top 5 and hold the center bearing in fixed position thereon.

The center bearing 9 is so positioned on the table top 5, as shown in Figure 1, that the distance from the center line of the cutting knife 14 of the machine 4 to the center 15 of the center bearing 9, which distance has been indicated by the chain line 16 in Figure 1, is equal to the radius of the curves to be cut to form the ends of the oval rug.

A guiding track arrangement, which is shown in Figure 6, cooperates with the center bearing 9. The track arrangement is mounted on the underside of turntable 7 as shown in Figure 3 and as indicated in dotted lines in Figure 1. The guiding track may be fabricated as a welded steel structure. As shown in Figures 3 and 6, it includes a mounting plate 17 to which longitudinal guide tracks 18 and 19 are welded. The ends of the guide tracks 18 and 19 are connected by arcuate end sections 20 and 21 which are welded to the longitudinal guide tracks 18 and 19. The spacing between the longitudinal guide tracks 18 and 19 is equal to the width of the center bearing 9, as will be clear from Figure 4, so that when the center bearing 9 is disposed between the tracks 18 and 19, guided movement of the turntable longitudinally along the length of the tracks 18 and 19 will be effected.

As shown in Figure 4, the center bearing 9 is provided with curved end surfaces 22 and 23, the radius of curvature of which corresponds to the radius of curvature of the inner diameter of the arcuate end sections 20 and 21 of the guide tracks. Thus, when the turntable is moved to a position where the center bearing 9 is disposed in axial alignment with one or the other of the arcuate end sections 20 and 21 of the guide tracks 18 and 19, the turntable may be pivoted about the center bearing 9 as an axis; and since, as mentioned previously, the distance from the center of the cutting knife 14 to the center 15 of the center bearing 9 is equal to the radius of curvature to be formed on the rug, such pivotal movement of the turntable with a piece of material to be severed mounted thereon will automatically result in severance of the piece to the desired end curvature.

The guiding track arrangement above described is received within an opening formed in a stop and guide rail arrangement which will be described below. The guiding track arrangement may be frictionally held in position, or wood screws 24 and 25, as shown in Figure 6, or other fastening may be used to secure the guiding trackway to the turntable 7.

The stop and guide rail arrangement may be fabricated from steel bars, and a unit so constructed is shown in Figure 6 where there are two longitudinal stop and guide rails 26 and 27 joined together by two end bars 28 and 29 welded thereto. The stop and guide rail arrangement is secured to the turntable 7, as shown in Figure 3, by machine screws 30 and 31 which pass through turntable 7 and are received in threaded openings in the guide rails 26 and 27.

The stop and guide rails 26 and 27 are arranged to cooperate with a ball-bearing stop and guide roller 32 shown in Figure 5, the position of which on the table top 5 is indicated in dotted lines in Figure 1. The stop and guide roller unit 32 (Figure 5) includes a spindle which is shouldered at 34, has a depending threaded portion 35, and has a ball-bearing receiving stud 36. The threaded portion of the spindle passes through an opening provided in the table top 5, and a nut 37 may be used to draw the spindle into position, with the shouldered portion 34 disposed against the upper surface of table 5. A ball bearing 38 is mounted on the stud 36 and acts as a stop and roller guide for cooperation with the stop and guide rails 26 and 27. The unit is shown in Figure 5 in a position with the guide rail 26 in engagement with bearing 38. This is the position of the unit in Figure 7. The guide rails 26 and 27 may be moved substantially frictionlessly in engagement with ball bearing 38, and during this movement they cooperate with center bearing 9 and tracks 18 and 19 to guide the turntable 7 in its straight runs. The distance 39 (Figure 1) from the axis of arcuate end section 20 to the axis of arcuate end section 21 of the guiding track determines the length of the straight runs which form the sides of the oval rug.

When rugs of different size are to be fabricated, the position of the center bearing 9 is changed to space it from the cutting knife 14 the desired distance, equal to the radius of curvature to be formed on the ends of the rug. A new guiding track unit is inserted to provide guided longitudinal movement of the desired length to provide the straight runs on the edges of the rug, connecting the curved ends. The guide rail assembly may be changed also, if necessary.

The operation of the device will be described with particular reference to Figures 1, 7, 8, and 9. At the start of the operation, the operator will position on the turntable 7 a rectangular piece of material 40 to be formed into an oval rug, for instance. The selvage edge 41 of the piece will be positioned to be cut by the cutting blade 14 of combined cutting and stitching machine 4, as shown in Figure 1. The machine 4 is started up and the feeding device on the machine engages the fabric and tends to advance the work through the zone of the cutting and sewing head. The turntable 7, which is guided by center bearing 9 disposed within the arcuate track section 21, pivots about the axis 15. This pivotal motion, which may be effected solely by the advancing action of the machine 4 operating on the blank 40 or which may be aided by the machine operator, continues until the turntable 7 has pivoted to a position where the stop and guide rail 26 lies in engagement with the ball-bearing stop and guide 32, a movement of the turntable through an angle of 90° from the position shown in Figure 1 to the position shown in Figure 7. This forms one half of the curved end 42 of the rug.

This brings the turntable to a position where the sides of the center bearing 9 are in alignment with the longitudinal guide tracks 18 and 19, and advancing movement of the blank 40 with the turntable 7 in the direction of the arrow in Figure 7, with the machine 4 performing a cutting and stitching operation, will result in formation of a severed and lock-stitched edge along the length of the straight run 43 of the rug. This longitudinal movement will be properly guided by the center bearing 9 and guide tracks 18 and 19, supplemented by engagement of guide rail 26 with ball-bearing stop and guide unit 32.

This longitudinal motion will continue until center bearing 9 and the curved end section 20 interengage, as shown in Figure 8. At that position ball-bearing stop and guide roller 32 will clear the end of guide rail 26, as shown in Figure 8. Thereupon, the advancing movement of the blank 40 as it is fed into the cutting and stitching zone of machine 4, aided by the operator, if necessary, will cause the turntable to rotate about the axis of the bearing 9, through 180° to the position shown in Figure 9, severing and stitching the rug along the whole of one curved end 44. This brings stop and guide rail 27 into engagement with ball-bearing stop and guide roller 32 and center bearing 9 and longitudinal guide tracks 18 and 19 into alignment for movement of the turntable in a straight run along the direction of the arrow shown in Figure 9 to form and stitch the edge 45 of the rug. At completion of such longitudinal movement, the turntable is in position for rotary motion about the axis 15 to complete the severance and stitching of the curved end 42, one half of which was cut and stitched at the start of the operation. Thus, an oval rug will have been severed from a rectangular blank and lock-stitched along its entire outer periphery.

I claim:

1. A work supporting and guiding device comprising a supporting table, a turntable mounted on said supporting table for movement in a substantially horizontal plane to define a closed oval path, a pivot bearing attached to said supporting table, and a guiding trackway carried by said turntable, said trackway having a pair of parallelly disposed longitudinally directed tracks in which said pivot bearing is received for guided movement of said turntable along said supporting table in a substantially straight line, said trackway having an arcuate end section joining said longitudinally directed tracks in which end section said pivot bearing is received for guided rotary movement of said turntable about said pivot bearing.

2. A work supporting and guiding device comprising a supporting table, a turntable mounted on said supporting table for movement in a substantially horizontal plane to define a closed oval path, a generally rectangular pivot bearing attached to said supporting table, and a guiding trackway carried by said turntable, said trackway having a pair of longitudinally directed tracks spaced to receive said pivot bearing therebetween on edge to guide said turntable during its longitudinal straight-line movements and said trackway having a pair of arcuate end tracks opening from said longitudinally directed tracks at opposite ends thereof to receive said pivot bearing to guide said turntable during its rotary movements about said pivot bearing.

3. A work supporting and guiding device for moving a workpiece through a closed path defining an oval comprising a supporting table, a turntable received on said supporting table, a pivot bearing secured to said supporting table, a guiding trackway on said turntable in which said pivot bearing is received for guided movement of said turntable with respect to said pivot bearing, said trackway having end portions to receive said pivot bearing for rotary motion of said turntable with respect to said pivot bearing and having an intermediate straight portion joining said end portions in which said pivot bearing is received for longitudinal motion of said turntable with respect to said pivot bearing, stop means carried by said supporting table, and stop engaging means carried by said turntable and engageable with said stop means for limiting the extent of said rotary motion of said turntable.

4. A work supporting and guiding device for moving a workpiece through a closed path defining an oval comprising a supporting table, a turntable received on said supporting table, a pivot bearing secured to said supporting table, a guiding trackway on said turntable in which said pivot bearing is received for guided movement of said turntable with respect to said pivot bearing, said trackway having arcuate end portions which engage said pivot bearing during rotary motion of said turntable with respect to said pivot bearing and having an intermediate straight portion joining said end portions which engages said pivot bearing during longitudinal motion of said turntable with respect to said pivot bearing, a stop and guide rail carried by said turntable and disposed substantially parallel to the length of said intermediate portion of said trackway, and stop and guide means carried by said supporting table and engageable with said stop and guide rail for limiting the extent of said rotary motion of said turntable and cooperating with said pivot bearing to guide said turntable during said longitudinal motion.

5. A work supporting and guiding device for moving a workpiece through a closed path defining an oval comprising a supporting table, a turntable received on said supporting table, a pivot bearing secured to said supporting table, a guiding trackway on said turntable in which said pivot bearing is received for guided movement of said turntable with respect to said pivot bearing, said trackway having arcuate end portions which engage said pivot bearing during rotary motion of said turntable with respect to said pivot bearing and having an intermediate straight portion joining said end portions which engages said pivot bearing during longitudinal motion of said turntable with respect to said pivot bearing, a pair of spaced stop and guide rails carried by said turntable and disposed substantially parallel to the length of said intermediate portion of said trackway on opposite sides thereof, and a stop and guide roller carried by said supporting table and engageable alternately with said stop and guide rails for limiting the extent of said rotary motion of said turntable and for guiding said turntable during said longitudinal motion.

6. A work supporting and guiding device for moving a workpiece through a closed path defining an oval comprising a supporting table; a turntable received on said supporting table for guided movement in a substantially horizontal plane thereover; a pivot bearing secured to said supporting table, said pivot bearing having two flat and parallel bearing surfaces and two connecting arcuate bearing surfaces; a guiding track secured to said turntable and cooperating with said pivot bearing to define an oval path of movement for said turntable, said guiding track including a pair of longitudinally directed parallel guide tracks which engage the flat bearing surfaces of said pivot bearing during longitudinal motion of said turntable, said guide tracks opening into arcuate track sections at the ends thereof which engage the arcuate bearing surfaces of said pivot bearing during rotary motion of said turntable, and a pair of guide rails disposed substantially parallel to said guide tracks on opposite sides thereof; and means secured to said supporting table and engageable alternately with said guide rails to cooperate with said guide tracks and pivot bearing to guide said turntable in its longitudinal motions and to arrest the rotary motions of said turntable.

References Cited in the file of this patent
UNITED STATES PATENTS 2,542,126  Everett et al. _____ Feb. 20, 1951